April 22, 1941.  E. G. HUZENLAUB ET AL  2,239,608
APPARATUS FOR THE TREATMENT OF CEREALS, STARCH, OR
THE LIKE WITH FLUIDS OR BY HEATING
Filed March 24, 1939   2 Sheets-Sheet 2

Inventors
ERICH G. HUZENLAUB
JOHN HERON ROGERS
by
Norris & Bateman
Attorneys

Patented Apr. 22, 1941

2,239,608

UNITED STATES PATENT OFFICE 2,239,608

APPARATUS FOR THE TREATMENT OF CEREALS, STARCH, OR THE LIKE WITH FLUIDS OR BY HEATING

Erich Gustav Huzenlaub, Brentford, and John Heron Rogers, Elmhurst, Kenley, England Application March 24, 1939, Serial No. 264,018
In Great Britain March 30, 1938

9 Claims. (Cl. 99—237)

This invention relates to apparatus for the treatment of materials such as cereals and has particular reference to plant employed for processes in which grain in the husked or dehusked state is subjected to the action of water and heat or to fluids such as steam or to vacuum.

It has been found that when grain and other starch containing material of a like nature is treated in a wet state under the influence of heat and pressure, there is a tendency for the starch or like material to swell, become tacky and adhere to the surfaces of the vessel in which the treatment is being carried on as well as to clog the orifices through which the various inlet and outlet pipes have access to the interior of the vessel. Further, the vessels normally employed for the purpose described have large capacities and are rotatable on trunnions which are made hollow. In such vessels vacuum is usually applied centrally from a pipe terminating in a perforated rose. The vacuum orifices are thus disposed within the body of material under treatment with the result that particles of matter adhere to the suction orifices and render them useless, this becoming increasingly evident when dehusked grain is treated and some of the grains are broken.

The object of the present invention is to avoid the disadvantages set out above and to provide an improved construction or arrangement wherein processes such as water impregnation, steam treatment or air and fluid evacuation can be carried on without the material under treatment clogging the orifices through which entry or extraction of the fluid takes place.

According to one aspect of the invention, apparatus for the treatment of materials such as cereals is provided comprising a vessel adapted to be rotated about hollow trunnions through which fluid or vacuum can be applied to the contents of the vessel characterised by the provision of a conduit extending between each or either of said trunnions and the outer end or ends or circumference of said vessel for the purpose of preventing the orifices through which the fluid or vacuum is applied from becoming obstructed by the material under treatment.

According to another aspect of the invention, apparatus for the treatment of materials such as cereals is provided comprising a vessel adapted to be rotated about hollow trunnions through which fluid or vacuum can be applied to the interior of the vessel characterised by the provision of a perforated ring adjacent the opening at one end of the vessel, the exterior of said ring communicating with one of said trunnions by means of a conduit extending along the wall of the vessel whereby steam or other fluid can be passed through the entire contents of the vessel whilst for drying vacuum can be applied without the solid contents of the vessel being in contact with the ring orifices.

Reference will now be made to the accompanying drawings which illustrate by way of example a rotatable vessel constructed according to the invention and in which.

Figure 2:
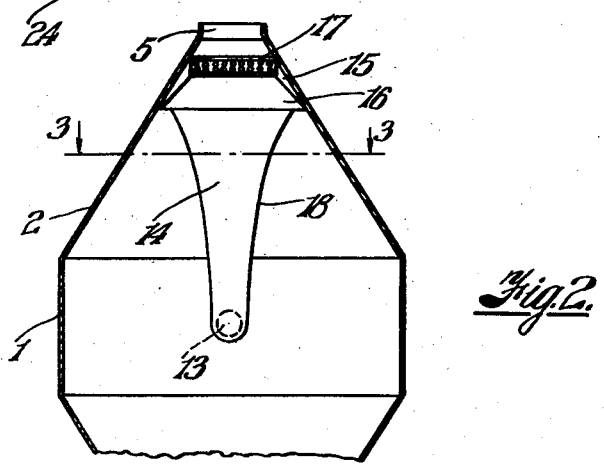
Figure 2 is a fragmentary sectional elevation taken on the line 2—2 of Figure 1 looking in the direction of the arrows.
Figure 3:
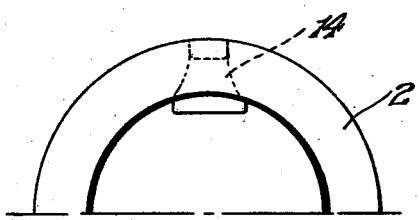
Figure 3 is a sectional plan taken on the line 3—3 of Figure 1.

In the construction illustrated the vessel consists of a central cylindrical portion 1 having tapering or cone-shaped ends 2, one of these ends being formed with an opening for charging and discharging of such dimensions as to afford ample space for access to the interior of the vessel, the said opening being provided with a cap or cover 3. The said cover is hinged at 4 to a cylindrical neck 5 with which the coned portion 2 terminates and opposite the hinge the cover is provided with a forked lug 6 adapted to be engaged by a nut and swivelled bolt 7 for locking the cover in closed position. The vessel 1—2 is provided with trunnions 8 and 9 rotatably mounted in supporting bearings 10. The trunnion 8 carries a worm wheel 11 driven from a worm 12 operated by any suitable source of power for the purpose of rotating the vessel 1—2 during the process of treating the materials contained in the vessel. The trunnion 8 is hollow and provides a passage 13 which at its inner end communicates with a conduit 14 formed partially around the inner wall of the conical portion 2 of the vessel. This conduit 14, as will be seen from Figure 2, tapers upwardly from its inlet end adjacent the passage 13 and opens at its upper end into an annular chamber 15 formed by a coned baffle 16 whose lower edge is fixed to the inner wall of the portion 2 except where it meets the wall of the conduit 14. The upper end of the baffle 16 terminates in a perforated ring 17 through which communication is established between the conduit 14 and the interior of the vessel, the upper edge of the said perforated ring being fixed to the interior of the coned portion 2.

The perforations in the ring 16 should be copious and of a diameter not exceeding .5 mm. so as to prevent the passage of grains or of broken grains, whilst at the same time enabling steam under pressure or vacuum to be applied freely to the interior of the vessel. The perforations can be constituted by holes formed in a metal sleeve or wire meshwork can be employed.

To avoid creating ledges or interstices about the interior of the vessel 1—2 the conduit 14 is made as a channel with its edges indicated at 18 curving into the contour of the interior of the vessel and welded or otherwise secured to the metal of the cover sides. Also, the ring 17 is formed as a collar in which no interstices exist in which grit or other material can lodge and collect and thus deterioration or contamination of subsequent batches of material is prevented.

The trunnion 9 is also hollow and in the construction illustrated forms a steam inlet which terminates in a pipe 19 and distributing rose 20 within the vessel 1—2.

Figure 1:
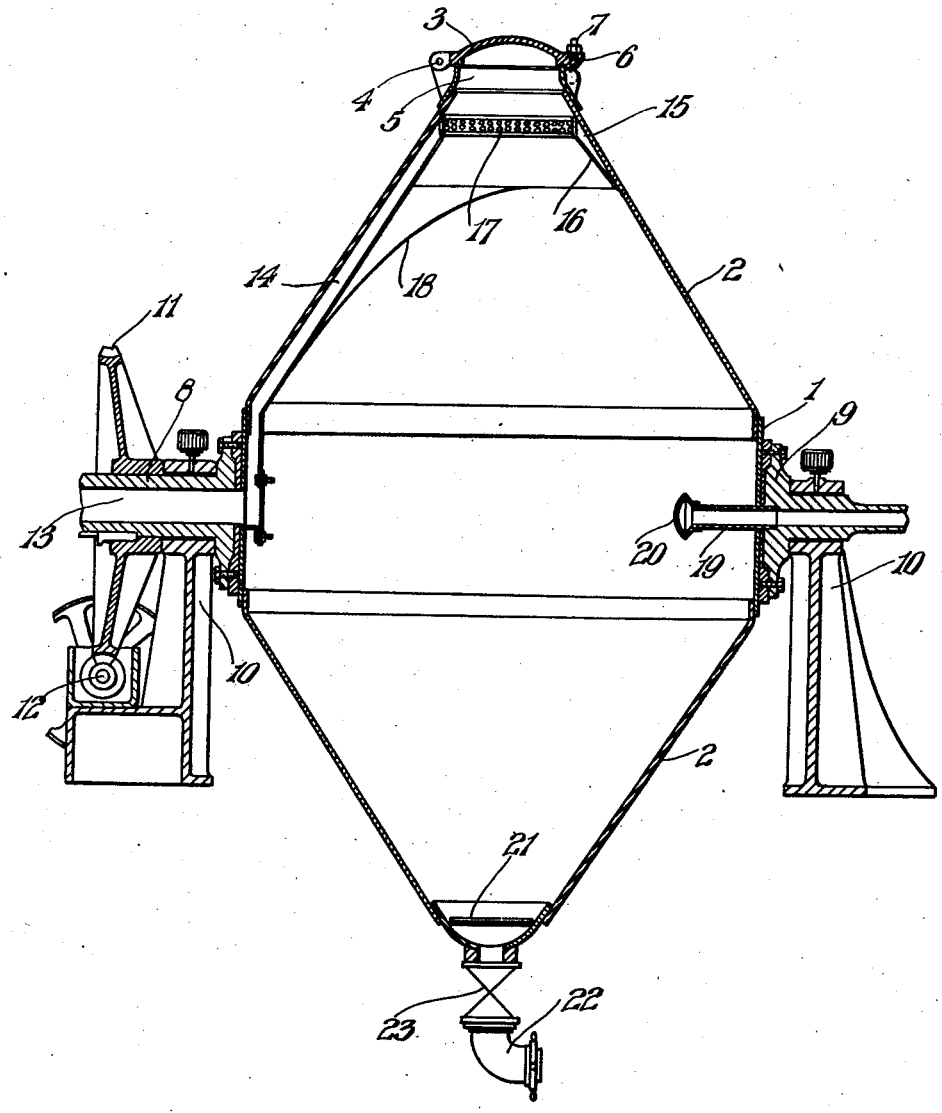
Figure 1 is a vertical sectional elevation.

The opposite end of the vessel to that occupied by the ring 17 may terminate as shown in Figure 1 in a filter grid 21 and outlet 22 for liquid controlled by a valve 23. In this way the material in the vessel can be drained of superfluous liquid without bringing the material into contact with the perforations in the ring 17.

When the vessel above described is in operation it is rotated about the axis of the trunnions 8 and 9 so that the material within is thoroughly stirred and admixed. Steam, hot water or other fluid is admitted if required during this operation. Both water and steam when introduced through the conduit 14 tend to clear the perforations in the ring 17 but when vacuum is applied this preferably takes place when the vessel is in the position shown in Figures 1 and 2 with the ring 17 in the uppermost position. In this position the ring lies above the contents of the vessel so that when vacuum is applied through the conduit 14 evacuation of air or steam can take place without risk of the solid materials being drawn into contact with the perforations in the ring 17.

In a modified form of the apparatus above described the ring 17 may be divided into two portions, the one communicating with the hollow trunnion 8 and the other communicating with the hollow trunnion 9, thus enabling, for example, the water supply to be kept separate from the vacuum source or steam supply from a water supply. In this manner any tendency of water to enter the vacuum pump or of steam to cause water hammer by condensation within the apparatus is avoided.

Figure 4:
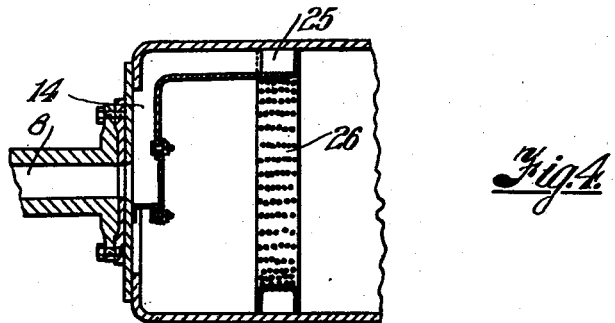
Figure 4 is a fragmentary sectional view of a modified construction.

In the modified construction shown in Figure 4 the application of the invention to a cylindrical vessel 24 is shown. The conduit 14 extends as before from the trunnion 8 to the outer periphery or circumference of the vessel and communicates with the interior of a ring 25 which has a perforated inner wall 26 through which fluid or vacuum applied through the said conduit acts on the contents of the vessel.

In all forms of the invention above described the area of the inlet and exit orifice constituted by the perforated ring can be made greater than that of the conduit 14 for the purpose of decreasing the velocity of fluid entering the vessel and that of its exit.

We claim:

1. In an apparatus for treating cereals and the like, a vessel mounted for rotation about a pair of trunnions, one of said trunnions being hollow and adapted to be placed in communication with a source of steam or vacuum, passage means inside said vessel placing said hollow trunnion in communication with one end of said vessel, remote from the axis of rotation thereof, a baffle member located in said one end of said vessel between the outer end of said passage means and said axis of rotation, and means associated with said baffle member and having a plurality of small apertures, for placing said passage means in communication with said one end of said vessel, whereby said vessel may be stopped with said one end uppermost and vacuum applied without causing the material to clog said apertures.

2. In an apparatus for treating cereals and the like, an elongated vessel, means mounting said vessel for rotation about an axis disposed transverse to its length, comprising a pair of trunnions, one of said trunnions being hollow and adapted for connection at its outer end to a source of steam or vacuum and at its inner end communicating with duct means, one end of said vessel having a charging opening and said duct means extending toward said charging opening along a wall of said vessel but terminating short thereof in a head having a plurality of small apertures, said head being so shaped as to permit material to be freely introduced into said vessel through said charging opening.

3. The apparatus defined in claim 2, wherein said duct means comprises a plate secured to the inside wall of said chamber, and cooperating therewith to provide a comparatively thin passage, said plate smoothly merging into the wall of said vessel, to avoid providing a ledge upon which cereal may be retained during rotation of said vessel.

4. In an apparatus for treating cereals and the like, an elongated treating vessel, a pair of trunnions on said vessel intermediate its length journalling said vessel for rotation about an axis normal to its length, said vessel having a charging opening at one end thereof, a hollow ring-like member associated with said one end of said vessel and having a plurality of apertures opening into said vessel adjacent said charging opening, one of said trunnions being hollow and adapted for connection to a source of steam or vacuum, and duct means connecting said hollow trunnions with said ring-like member.

5. The apparatus defined in claim 4, wherein said ring-like member and said duct means are disposed interiorly of said vessel.

6. The apparatus defined in claim 4, wherein said duct means comprises a conduit located inside said vessel and increasing in breadth from said hollow trunnion to said ring-like member.

7. In an apparatus for treating cereals and the like, an elongated vessel, means mounting said vessel for rotation, comprising a pair of trunnions, one of said trunnions being hollow and adapted for connection to a source of steam or vacuum, an annular member disposed in fluid tight engagement with the inner wall of said vessel at two spaced zones, to provide a hollow chamber extending around the inside wall of said vessel, said member being provided with a plurality of apertures facing toward the longitudinal axis of said vessel, and a conduit lying closely adjacent the inner wall of said vessel and placing the interior of said annular member in fluid communication with said hollow trunnion.

8. The apparatus defined in claim 7, wherein said vessel is mounted for rotation about its longitudinal axis, said axis being disposed substantially horizontally.

9. The apparatus defined in claim 7, wherein said vessel is mounted for rotation about an axis disposed substantially normal to its longitudinal axis, whereby rotation thereof causes the contained material to tumble alternately from one end of the vessel to the other.

ERICH GUSTAV HUZENLAUB.
JOHN HERON ROGERS.